(12) United States Patent
Hashemi

(10) Patent No.: US 6,425,052 B1
(45) Date of Patent: Jul. 23, 2002

(54) LOAD BALANCING CONFIGURATION FOR STORAGE ARRAYS EMPLOYING MIRRORING AND STRIPING

(75) Inventor: Ebrahim Hashemi, Los Gatos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/429,687

(22) Filed: Oct. 28, 1999

(51) Int. Cl.$^7$ ................................. G06F 12/00
(52) U.S. Cl. ........................................ 711/114
(58) Field of Search ........................ 711/114

(56) References Cited

U.S. PATENT DOCUMENTS

| | | | | |
|---|---|---|---|---|
| 5,258,984 A | * | 11/1993 | Menon et al. ................. | 714/7 |
| 5,636,356 A | * | 6/1997 | Kakuta et al. ................ | 395/441 |
| 5,678,061 A | * | 10/1997 | Mourad ........................ | 710/21 |
| 6,076,143 A | * | 6/2000 | Blumenau .................... | 711/114 |
| 6,154,853 A | * | 11/2000 | Kedem .......................... | 714/6 |
| 6,170,037 B1 | * | 1/2001 | Blumenau .................... | 711/114 |

FOREIGN PATENT DOCUMENTS

| | | |
|---|---|---|
| EP | 518 603 | 12/1992 |
| EP | 755 009 | 1/1997 |

OTHER PUBLICATIONS

Massiglia, Paul. The RAID Book. 6th Edition. 1997. pp. 206–208.*
Foreign Search Report, PCT/US 00/28556, mailed Oct. 13, 2000.
*RAID, An Overview*, John Ewing, Dec. 1993, Storage Technology Corporation, 10 pages.
*AC&NC RAID Technology*, Advanced Computer and Network Corp, 1997/1998, 11 pages.
*Information Brief; IntelliStation RAID Technology*, IBM, 1998 7 pages.
*What is RAID?*, Digi–Data Corporation, 1997, 3 pages.
*Research Report: Distributed Sparing for Improved Performance of Disk Arrays*. Jai Menon, Dick Mattson, Spencer Ng, IBM Research Division, Jan. 24, 1991, 23 pages.
*Introduction to Redundant Arrays of Inexpensive Disks (RAID)*, Patterson, Chen, Gibson and Katz, Dept. of Electrical Engineering and Computer Sciences, Univ. of Calif., 12 pages.

(List continued on next page.)

Primary Examiner—Kevin Verbrugge
(74) Attorney, Agent, or Firm—Conley, Rose & Tayon, PC; Robert C. Kowert (57) ABSTRACT

An array of storage devices may be provided in which data is both striped and mirrored across the array. Data may be organized in stripes in which each stripe is divided into a plurality of stripe units. The stripe units may be mapped sequentially to consecutive storage devices in the array for each data stripe. Each data stripe is also mirrored within the array as a mirrored data stripe. Each mirrored data stripe is also divided into a plurality of stripe units. The stripe units of the mirrored stripes are distributed throughout the array according to a mapping that provides for load balancing during a reconstruction operation. According to one embodiment, stripe units for mirrored stripes are distributed according to a rotational group such that each mirrored stripe is rotated on the array by one more position than the previous mirrored stripe and wherein the rotational group is repeated as necessary. Alternatively, the mirrored stripe units may be distributed according to other permutations to improve load balancing during reconstruction of a failed device. In other embodiments, in addition to mapping mirrored stripe units to balance read operations during reconstruction, one or more spare storage devices may be striped throughout the array to improve load balancing for write operations during reconstruction.

33 Claims, 9 Drawing Sheets

OTHER PUBLICATIONS

*A Case for Redundant Arrays of Inexpensive Disks (RAID)*, Patterson, Gibson, Katz, Dept. of Electrical Engineering and Computer Sciences, Univ. of Calif., 1988 ACM, pp. 109–116.

*Topics in Algebra*, $2^{nd}$ Edition, Herstein, Univ. Of Chicago, Xerox College Publishing, Lexington, Mass., 1975, 7 pages.

*Optimal Data Allotment to Build High Availability and High Performance Disk Arrays*, IBM Technical Disclosure Bulletin, vol. 37, No. 5, May 1994, pp. 75–59.

*A Performance Study of Three High Availability Data Replication Strategies*, Hsiao and DeWitt, XP-002163988, IEEE 1991, pp. 18–28.

*A Performance Evaluation of RAID Architectures*, Chen, XP-000635537, IEEE 1996, 8 pages. (both sides).

*A Novel Replica Placement Strategy for Video Servers*, Gafsi and Biersack, XP-000992162, Dec. 10, 1999, pp. 321–335.

*Stripped Mirroring RAID Architecture*, Jim and Hwang, Journal of Systems Architecture, 2000 Elsevier Science B.V., pp. 543–550.

\* cited by examiner

LOAD BALANCING CONFIGURATION FOR STORAGE ARRAYS EMPLOYING MIRRORING AND STRIPING

BACKGROUND OF THE INVENTION

1. Field of the Invention

This invention relates to computer data storage systems, and more particularly to arrays of storage devices that employ mirroring and striping of data, such as certain Redundant Array of Independent Disks (RAID) systems, and to mechanisms for load balancing in such storage systems when operating in a degraded mode such as when reconstructing a failed storage device.

2. Description of the Related Art

A continuing desire exists in the computer industry to consistently improve the performance of computer systems over time. For the most part this desire has been achieved for the processing or microprocessor components of computer systems. Microprocessor performance has steadily improved over the years. However, the performance of the microprocessor or processors in a computer system is only one component of the overall performance of the computer system. For example, the computer memory system must be able to keep up with the demands of the processor or the processor will become stalled waiting for data from the memory system. Generally computer memory systems have been able to keep up with processor performance through increased capacities, lower access times, new memory architectures, caching, interleaving and other techniques.

Another critical component to the overall performance of a computer system is the I/O system performance. For most applications the performance of the mass storage system or disk storage system is the critical performance component of a computer's I/O system. For example, when an application requires access to more data or information than it has room in allocated system memory, the data may be paged in/out of disk storage to/from the system memory. Typically the computer system's operating system copies a certain number of pages from the disk storage system to main memory. When a program needs a page that is not in main memory, the operating system copies the required page into main memory and copies another page back to the disk system. Processing may be stalled while the program is waiting for the page to be copied. If storage system performance does not keep pace with performance gains in other components of a computer system, then delays in storage system accesses may overshadow performance gains elsewhere.

One method that has been employed to increase the capacity and performance of disk storage systems is to employ an array of storage devices. An example of such an array of storage devices is a Redundant Array of Independent (or Inexpensive) Disks, RAID. A RAID system improves storage performance by providing parallel data paths to read and write information over an array of disks. By reading and writing multiple disks simultaneously the storage system performance may be greatly improved. For example, an array of four disks that can be read and written simultaneously may provide a data rate almost four times that of a single disk. However, using arrays of multiple disks comes with the disadvantage of increasing failure rates. In the example of a four disk array above, the mean time between failure (MTBF) for one of the four disks of the array will be one-fourth that of a single disk. It is not uncommon for storage device arrays to include many more than four disks, shortening the mean time between failure from years to months or even weeks. RAID systems address this reliability issue by employing parity or redundancy so that data lost from a device failure may be recovered.

One common RAID technique or algorithm is referred to as RAID 1. In a RAID 1 system all data is mirrored within the storage system. In other words, a duplicate copy of all data is maintained within the storage system. Typically, a RAID 1 system performs mirroring by copying data onto two separate disks. Thus a typical RAID 1 system requires twice the number of disks. In general, one disadvantage of RAID 1 systems is that they may not provide for load balancing over multiple disks within the system. For example, the data used by a given application may be located all on one disk of the RAID 1 system. If the bulk of storage system accesses are being generated by that one application, then the storage system load will be concentrated on a single device, thus negating the performance advantage of having an array of disks.

RAID 0 is an example of a RAID algorithm used to improve performance by attempting to balance the storage system load over as many of the disks as possible. RAID 0 implements a striped disk array in which data is broken down into blocks and each block is written to a separate disk drive. Thus technique may be referred to as striping. Typically, I/O performance is improved by spreading the I/O load across multiple drives since blocks of data will not be concentrated on any one particular drive. However, a disadvantage of RAID 0 systems is that they do not provide for any data redundancy and are thus not fault tolerant.

RAID 5 is an example of a RAID algorithm that provides some fault tolerance and load balancing. In RAID 5 systems both data and parity information are striped across the storage device array. RAID 5 systems can withstand a single device failure by using parity information to rebuild a failed disk. However, write performance may suffer in RAID 5 systems due to the overhead of calculating parity information. However, only one additional disk is required to store parity information as opposed to the 2X number of disks required for typical RAID 1 systems.

Figure 1:
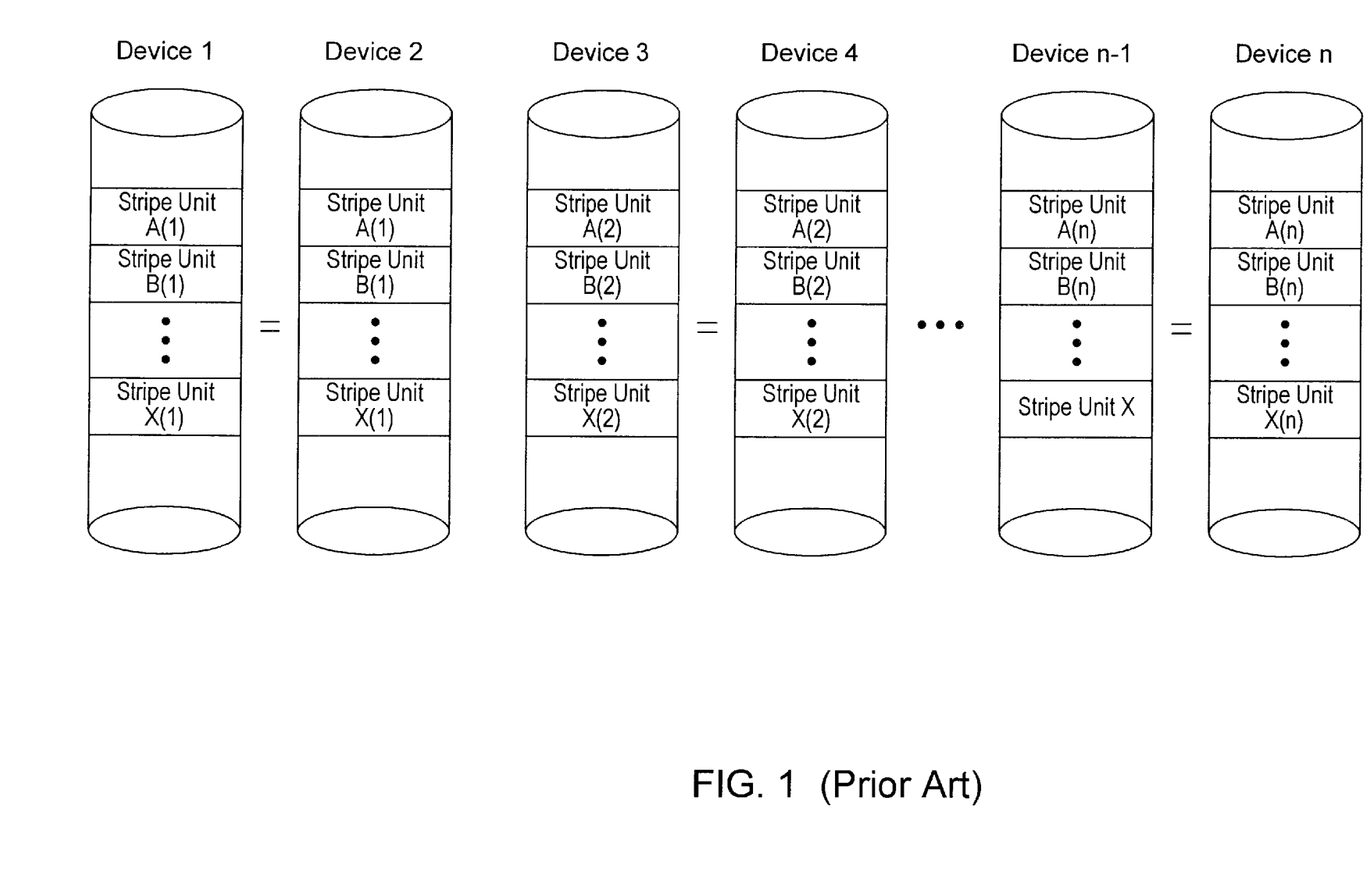
FIG. 1 is an illustration of a storage array employing conventional data striping and mirroring.

Another RAID technique referred to as RAID 10 or RAID 0+1 attempts to combine the advantages of both mirroring and striping. FIG. 1 illustrates how data is stored in a typical RAID 10 system. Data is stored in stripes across the devices of the array. FIG. 1 shows data stripes A, B, . . . X stored across n storage devices. Each stripe is broken into stripe units, where a stripe unit is the portion of a stripe stored on each device. FIG. 1 also illustrates how data is mirrored on the array. For example, stripe unit A(1) is stored on devices 1 and 2, stripe unit A(2) is stored on devices 3 and 4, and so on. Thus, devices 1 and 2 form a mirrored pair, as do devices 3 and 4, etc. As can be seen from FIG. 1, this type of system will always require an even number of storage devices (2X the number of drives with no mirroring). This may a disadvantage for some users who have a system containing an odd number of disks. The user may be required to either not use one of his disks or buy an additional disk.

A storage array is said to enter a degraded mode when a disk in the array fails. This is because both the performance and reliability of the system (e.g. RAID) may become degraded. Performance may be degraded because the remaining copy (mirror copy) may become a bottleneck. To reconstruct a failed disk onto a replacement disk may require a copy operation of the complete contents of the mirror disk for the failed disk. The process of reconstructing a failed disk imposes an additional burden on the storage system. Also, reliability is degraded since if the second disk fails before the failed disk is replaced and reconstructed the array may unrecoverably lose data. Thus it is desirable to shorten the amount of time it takes to reconstruct a failed disk in order to shorten the time that the system operates in a degraded mode.

In the example of FIG. 1, if device 1 fails and is replaced with a new device, the data that was stored on device 1 is reconstructed by copying the contents of device 2 (the mirror of device 1) to the new device. During the time the new device is being reconstructed, if device 2 fails, data may be completely lost. Also, the load of the reconstruction operation is unbalanced. In other words, the load of the reconstruction operation involves read and write operations between only device 2 and the new device.

Figure 2:
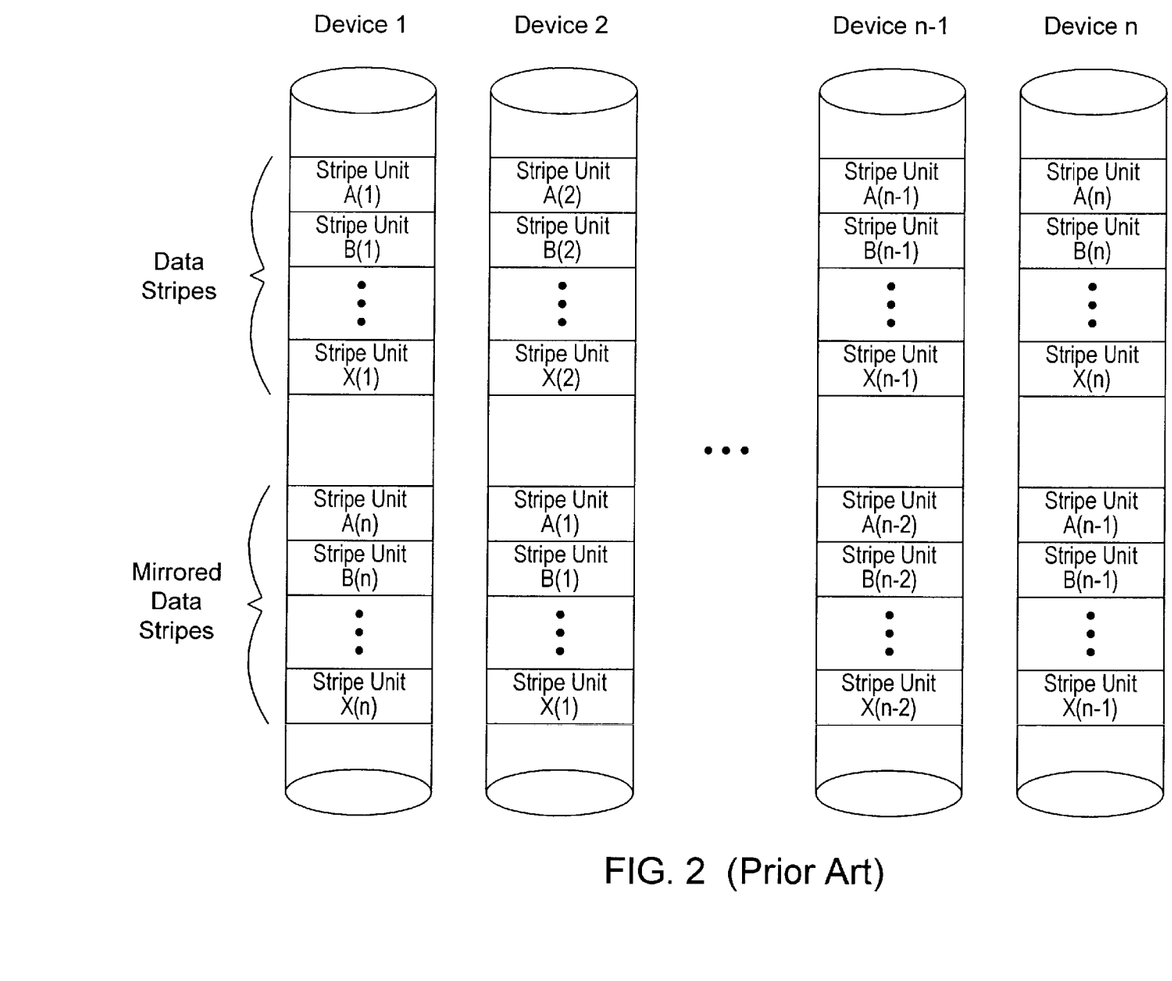
FIG. 2 is an illustration of a storage array employing conventional data striping and one position skewed mirroring.

Turning now to FIG. 2, an example of a storage array is shown that attempts to overcome some of the disadvantages associated with the array of FIG. 1. In the array of FIG. 2, data is also striped across the devices of the array. Data stripes A through X are shown, where X may be any number of data stripes within the capacity of the array. Each stripe each divided into stripe units with each device storing a different stripe unit of a data stripe. The "original" stripe units are mapped sequentially to consecutive devices. Each data stripe is also mirrored across the array. However, instead of mirroring the data stripes by duplicating each disk as in FIG. 1, the mirrored data stripes are stored on the array skewed by one device position from the original data stripe. Note that the terms "original" and "mirrored" are simply used to provide a frame of reference but in normal operation there is no difference between an "original" data stripe "mirrored" data stripe. As shown in FIG. 2, the mirrored data stripes are all skewed together by one device. For example, original stripe unit A(1) is stored on device 1 and the mirrored copy of stripe unit A(1) is stored on device 2. Likewise, original stripe unit B(1) is stored on device 1 and the mirrored copy of strip unit B(1) is stored on device 2. Thus, all mirrored stripe units are skewed by one device position. By skewing the mirrored data several improvements over the system of FIG. 1 are achieved. Although the system of FIG. 2 still requires double the amount of storage capacity since all data is mirrored, the mirroring of data may be accomplished over an even or odd number of drives.

In the system of FIG. 2 each half of a device is mirrored in half of one other device. For example, for device 2, original stripe units A(2), B(2) . . . X(2) are mirrored in device 3 (not shown), and device 2 also contains the "mirror" copies of stripe units A(1), B(1) . . . X(1) from device 1. If device 2 fails the replacement for device 2 may be reconstructed by reading data from both device 3 and device 1 and writing that data to the replacement device 2. Thus, the system of FIG. 2 provides some load balancing improvement over the system of FIG. 1 in that reconstruction reads are now spread over two devices, although reconstruction writes are still focused on one device.

For large arrays of storage devices, the MTBF for any one of the devices may be fairly short. Thus large arrays may spend a significant amount of time operating in a degraded mode. To improve degraded mode operation, it would be desirable to improve the load balancing of the reconstruction operation.

SUMMARY OF THE INVENTION

An array of storage devices may be provided in which data is both striped and mirrored across the array. Data may be organized in stripes in which each stripe is divided into a plurality of stripe units. The stripe units may be mapped sequentially to consecutive storage devices in the array for each data stripe. Each data stripe is also mirrored within the array as a mirrored data stripe. Each mirrored data stripe is also divided into a plurality of stripe units. The stripe units of the mirrored stripes are distributed throughout the array according to a mapping that provides for load balancing during a reconstruction operation. According to one embodiment, stripe units for mirrored stripes are distributed according to a rotational group such that each mirrored stripe is rotated on the array by one more position than the previous mirrored stripe and wherein the rotational group is repeated as necessary. Alternatively, the mirrored stripe units may be distributed according to other permutations to improve load balancing during reconstruction of a failed device. In other embodiments, in addition to mapping mirrored stripe units to balance read operations during reconstruction, one or more spare storage devices may be striped throughout the array to improve load balancing for write operations during reconstruction.

In one embodiment, an array of storage devices having at least three storage devices is configured to store stripes of data. A first stripe of data is stored as a plurality of stripe units stored consecutively across consecutive ones of the storage devices. One or more additional stripes of data are also stored as pluralities of stripe units in the same consecutive order as the first stripe of data across consecutive storage devices. A copy of the first stripe of date is stored as copies of the first stripe units. Each one of the copies of the stripe units from the first stripe of data is stored on a different one of the storage devices than the one of the stripe units of which it is a copy. A copy of each of the one or more additional stripes of data are also stored. Each one of the stripe unit copies for the copies of additional data stripes are stored on a different one of the storage devices than the stripe unit of which it is a copy. The copied or mirrored stripe units of the first data stripe are stored on the storage devices in a first order. The copied, or mirrored, stripe units for a second data stripe are stored on the storage devices in a second order. Wherein the first order is different than the second order. In one embodiment, the order in which the copied or mirrored stripe units from the first data stripe are stored is the order by which the first data stripe is stored rotated by one storage device and the second order is that order rotated by two storage devices. For additional copied data stripes, the stripe units are stored in increasing rotational order until the rotational group is repeated. The rotational group may be repeated as often as necessary for additional data stripe copies (mirror copies).

One embodiment of a storage system may include an array of at least four storage devices and a storage controller coupled to the storage devices. A storage controller may be configured to store data in stripes across the storage devices. The storage controller may further be configured to mirror each stripe of data on the storage devices. Additionally, the storage controller may be configured to perform a reconstruction operation to reconstruct lost data from a failed storage device. The reconstruction operation may include reading different portions of the lost data from at least three of the remaining storage devices of the array. In a preferred embodiment, the reconstruction operation includes reading different portions of the lost data from all of the remaining storage devices of the array. The array may include an even or odd number of storage devices. The reconstruction operation may also include writing different portions of the lost data to two or more remaining storage devices of the array. Alternatively, lost data may be written to a single replacement device.

A storage system may include an array of n storage devices where n is greater than 2. The storage system may also include a storage controller coupled to the storage devices. The storage controller may be configured to store a group of data stripes across the storage array. Each data stripe may have a plurality of stripe units with each stripe unit stored on different ones of the storage devices. The storage controller may be further configured to store a copy of the group of data stripes on the storage devices. The copy of the group of data stripes may include a series of data stripe copies. Each data stripe copy includes stripe units stored on the storage devices in a rotated position from the stripe units of which they are copies. The stripe units of a first one of the series of data stripe copies is rotated by one storage device position and the stripe units of each one of the other data stripe copies for the group is rotated by one more position than the previous data stripe copy. Additional groups of data stripes and data stripe copies may be included in which this rotational positioning is repeated. The order of the group of data stripes is the same for each data stripe whereas the order for the group of data stripe copies follows the rotational group. The group of data stripes may have n−1 data stripes. Each data stripe may include n stripe units. Alternatively, each data stripe may include n−1 stripe units and a spare stripe unit. Also, embodiments may be included in which fewer stripe units and more spare units are included. The spare stripe unit for each data stripe in a group is stored on a different storage device in one embodiment.

A method for distributing copies of data in an array of storage devices may include storing a first data stripe across the storage devices. The first data stripe may have a plurality of first stripe units with each one of the first stripe units stored on different ones of the storage devices. The method also may include storing a copy of the first stripe unit on the storage devices. Stripe units of the copy of the stripe are rotated by one position from the first stripe. The method further may include storing a series of additional data stripes and copies of the additional data stripes where the copies of the additional data stripes are rotated by one more storage device position than a previous additional data stripe copy so that the ordering of the data stripe copies follows a rotational group.

A method for storing data in an array of storage devices may include storing data in stripes across the storage devices and mirroring each stripe of data on the storage devices. The method may further include reconstructing lost data from a failed one of the storage devices. The reconstructing may include reading different portions of the lost data from at least three of the remaining storage devices of the array. The reconstructing may also include writing different portions of the lost data to two or more devices of the array.

Generally speaking, a method for storing data on an array of storage devices in which data is striped across the storage devices may include mirroring the original data stripes in which mirrored data stripes are stored on the storage devices in a different position than other mirrored data stripes of a same group of mirrored data stripes and in a different position from the original data stripe of which it is a mirror copy. Each group may have at least three mirrored data stripes and the mirroring may be repeated for additional groups. The method may also include storing a spare data stripe across the storage devices for each group of original and mirrored data stripes.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 3:
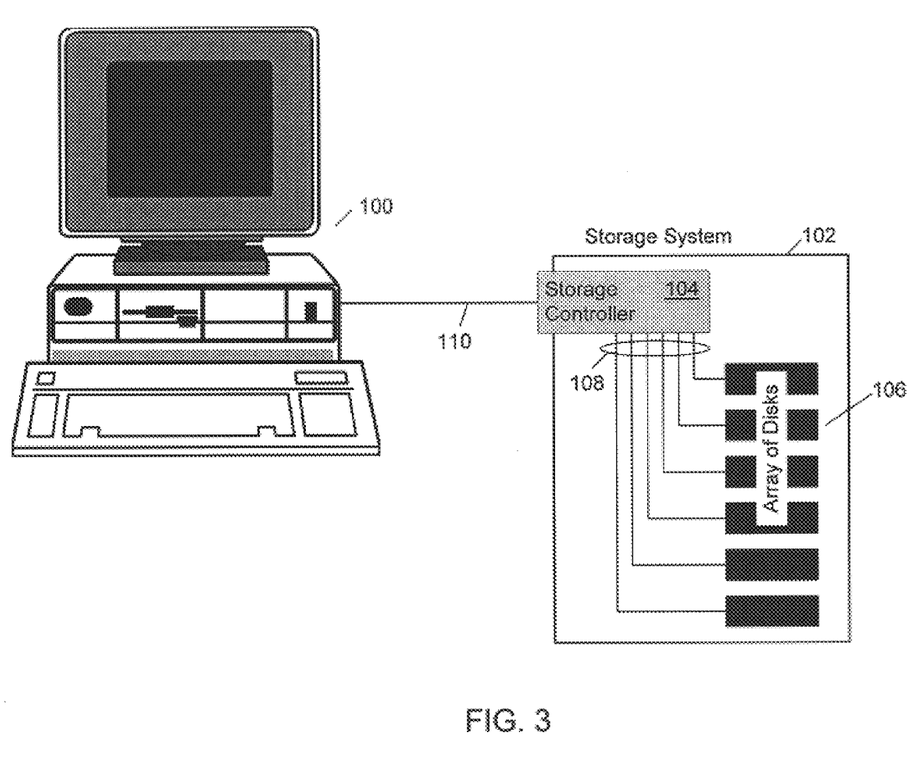
FIG. 3 is an illustration of a computer and storage system including a storage system in which improved load balancing for reconstruction operations may be employed.

Turning now to FIG. 3, an example of a computer storage system in which embodiments of the invention may be employed is illustrated. A storage system array 102, such a RAID system, may be coupled to a computer system 100 by an I/O bus 110. The computer system 100 may include one or more processors and various I/O devices such as a monitor, keyboard, mouse, etc. The storage array system 102 may include a storage controller 104 and an array of storage devices 106. The storage controller 104 controls the mapping, accessing, reconstructing, etc. of data on the array of storage devices 106. The array of storage devices 106 may be coupled to the storage controller 104 by storage channels or buses 108. Buses 110 and 108 may be implemented according to various standards such as fiber channel arbitrated loop (FC-AL), SCSI, HIPPI, ATA, etc. Also, bus 110 may be an I/O bus such as the peripheral component interconnect (PCI) bus.

Storage controller 104 operates to perform both striping and mirroring of data on the array of storage devices 106 according to the mechanism described below. Note that each element of the array of storage devices 106 may be a separate disk or any other logical division of storage devices. For example, each element of the array may be a cylinder of a hard disk. It is also noted that the system may include multiple ones of storage system 102. Also each storage system 102 may include multiple arrays of multiple disks and/or multiple storage controllers 104. In a preferred embodiment each array includes at least three storage devices and typically would include more than three storage devices such as four, five or more devices.

Figure 4A:
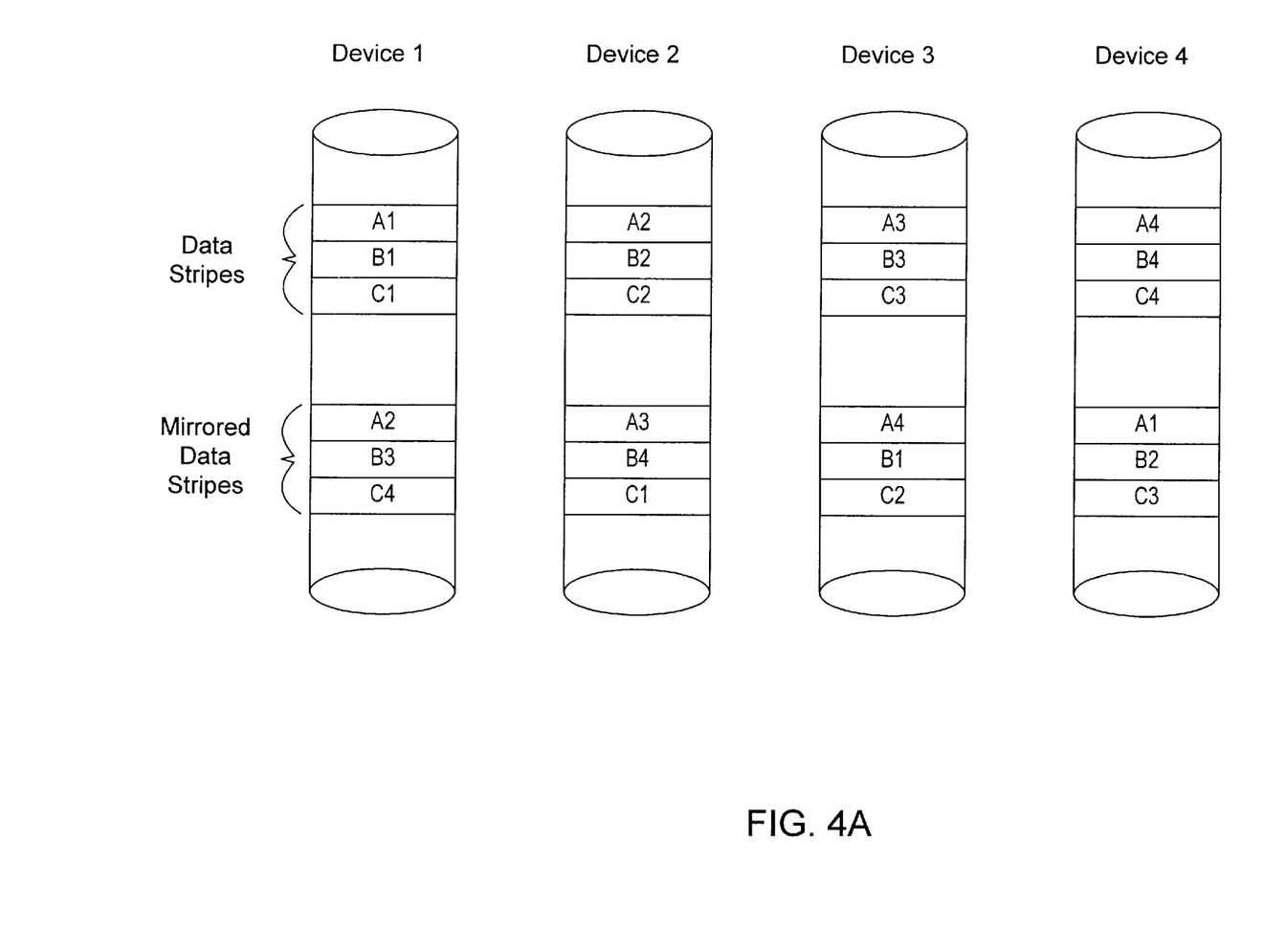
FIG. 4A is an illustration of one embodiment of a storage array employing data striping and distributed rotational mirroring for improved load balancing.

Turning now to FIG. 4A, a mechanism according to one embodiment for storing data on devices of a storage array is illustrated. For ease of illustration, an array of only four devices is illustrated. However, the number of devices is not limited to four. For example, an array employing the mechanism illustrated in FIG. 4A may include only three storage devices or many more than four storage devices. Also, for ease of illustration, only three different stripes of data are shown. However, the mechanism may clearly be applied to more than three data stripes.

As shown in FIG. 4A, data stripes are divided in stripe units mapped S sequentially to consecutive devices. Each stripe unit may be an entire block of data or any other subdivision of data down to the bit level. For the example of FIG. 4A, each data stripe A, B and C is divided into four stripe units across the four storage devices. Device 1 includes stripe units A(1), B(1) and C(1). Device 2 includes stripe units A(2), B(2) and C(2), and so on. Each data stripe is also mirrored within the array. The mirrored data is striped in a way to improve load balancing during reconstruction operations. The mirrored data is striped across the array according to a mechanism that balances reconstruction operations across three or more devices of the array. In the example of FIG. 4A, the mirrored data is striped according to the rotational group of the striped units.

A rotational group is a mathematical structure which may be calculated according to a mathematical function. A rotational group may be expressed as follows: for a set of n objects the rotational group is the different orders of the objects obtained by rotating a beginning order by one position for each subsequent order until the order is repeated. For example, for the set of four objects $\{1, 2, 3, 4\}$ one rotational group is as follows:

| 1 | 2 | 3 | 4 |
|---|---|---|---|
| 2 | 3 | 4 | 1 |
| 3 | 4 | 1 | 2 |
| 4 | 1 | 2 | 3 |

The first function of a rotational group is the identity function (i.e. rotated by zero positions). The identity function is not applied to the mirrored data since it would result in repeating copies of each stripe unit on the same device as the original copy and thus not providing for fault tolerance in case of device failure. Thus, only the rotational functions beyond identity are applied. The first mirrored data stripe is rotated by one position. In the example of FIG. 4A, the mirrored data stripe A is rotated to the left by one position from original data stripe A. Note that rotations to the right are used in alternate embodiments. The next mirrored data stripe is rotated by two positions, as shown for mirrored data stripe B. This may be continued until the rotational group is repeated (after three stripes in this example). The entire rotational group may then be repeated as often as necessary for additional data stripes. Thus, according to the embodiment of FIG. 4A, each mirrored data stripe is rotated by one more device position than the previous mirrored data stripe for a group of data stripes. In one embodiment the rotations are repeated after every n−1 consecutive data stripes for an array of n storage devices.

Figure 4B:
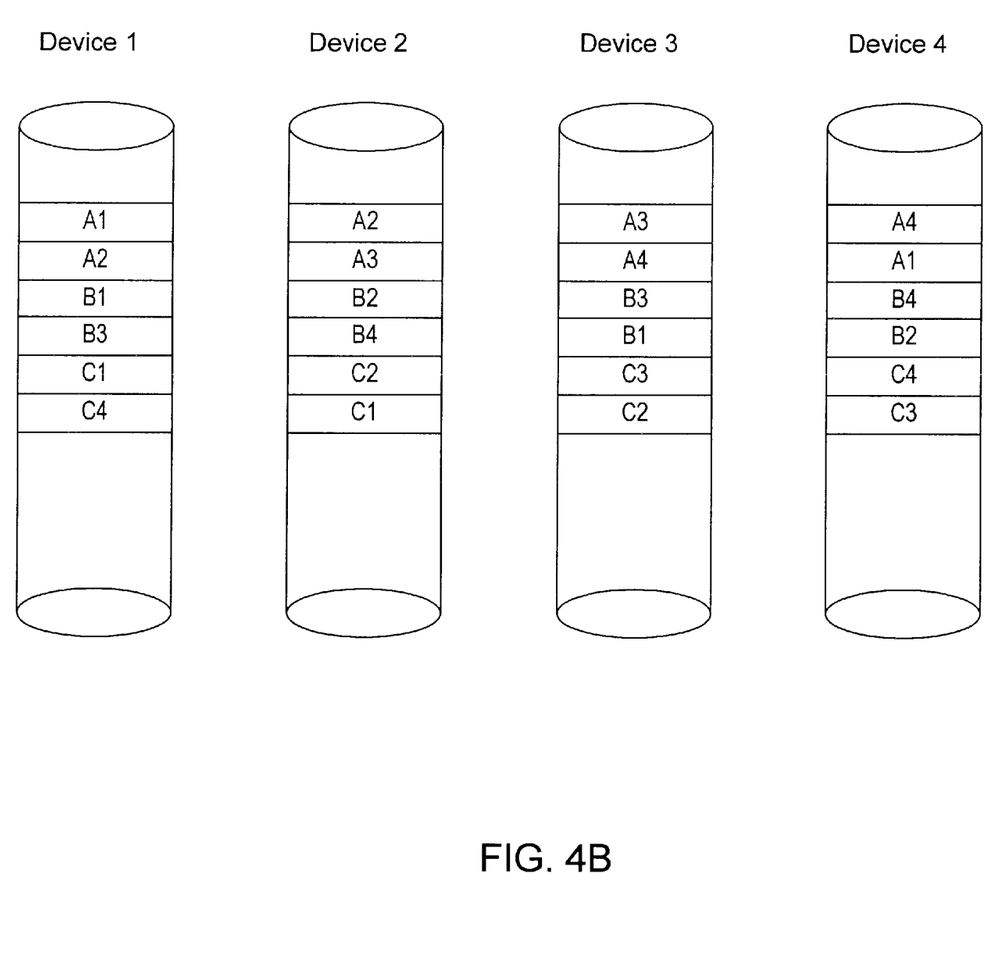
FIG. 4B is an illustration of another embodiment of a storage array employing data striping and distributed rotational mirroring for improved load balancing.

FIG. 4B illustrates an embodiment similar to that in FIG. 4A in which the mirrored data stripes are striped according to the rotational group of the striped units. However, in the embodiment of FIG. 4B, the "mirror" stripe units for each stripe are stored following the "original" stripe unit on each storage device, instead of storing the mirror stripe units on the other half of each storage device. This embodiment may be preferred in order to allow more flexibility since each storage device does not need to be pre-allocated into a "original" stripe unit half and a "mirror" stripe unit half.

Note also that additional mirror copies may be stored according to a rotational group or other mathematical structure or permutation. For example, the mappings of FIGS. 4A or 4B could easily be expanded to include two, three, four, or more "mirror" stripe unit copies for each "original" stripe unit. Providing additional mirror copies may provide extra data protection at the expense of storage space.

Figure 5:
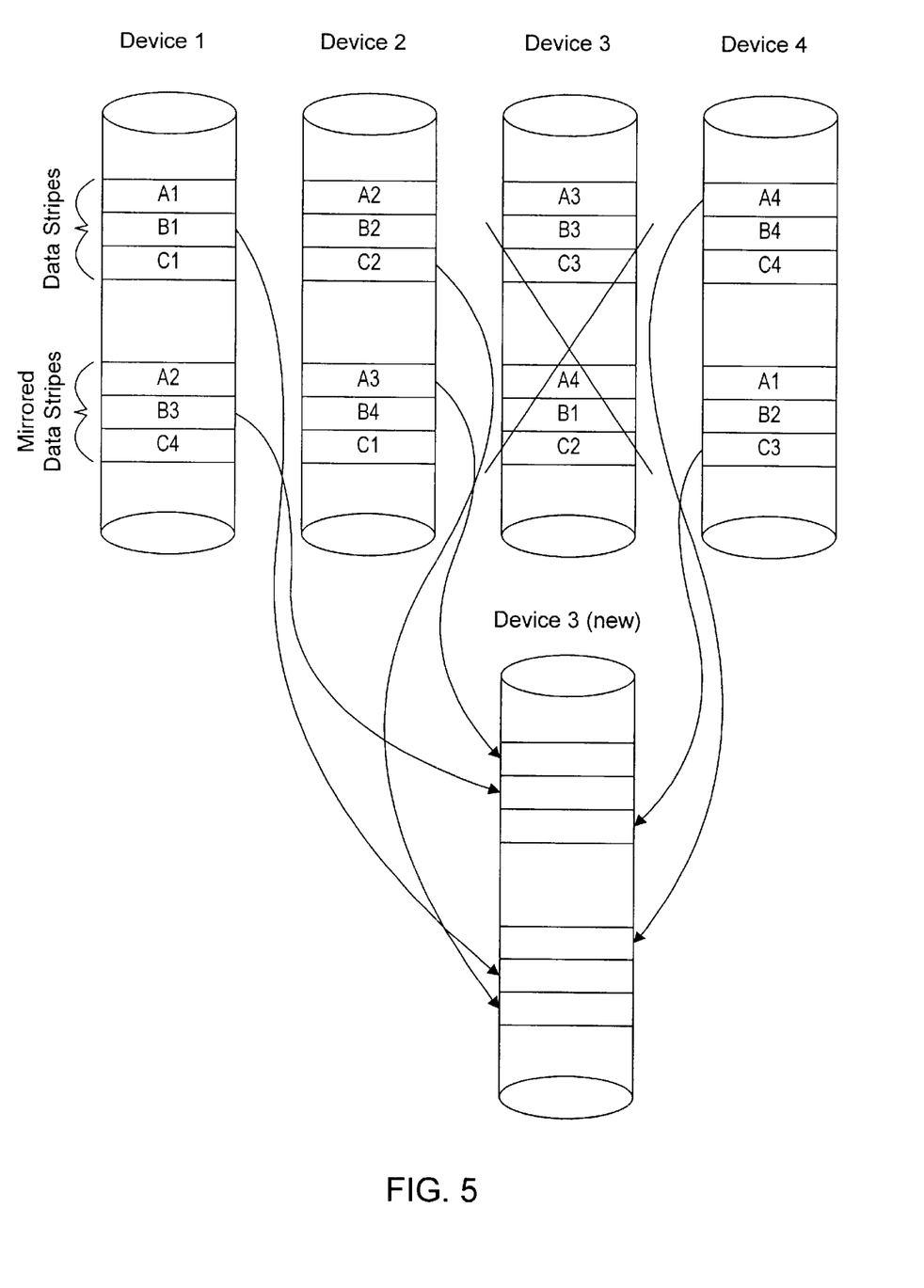
FIG. 5 illustrates a reconstruction operation for the array of FIG. 4A.

The mechanism of mirroring data stripes according to a mathematical structure such as a rotational group allows parallelization of reconstruction read operations during a degraded mode of operation. Turning now to FIG. 5, an array in which data has been striped and mirrored according to the mechanism of FIG. 4A is illustrated in which device 3 has failed and has been replaced with a new device. The data that was contained on failed device 3 may be reconstructed onto the new device 3 by accessing the other devices of the array. As graphically illustrated in FIG. 5, it can be seen that the data for reconstruction is equally distributed between the remaining devices of the array. For example, device 3 "original" copy of stripe unit B(3) may be obtained from the "mirrored" copy of stripe unit B(3) on device 1. Similarly, device 3's mirrored copy of stripe unit B(1) may be obtained from device 1's "original" copy of stripe unit B(1). In a similar fashion, stripe units C(2) and A(3) are obtained from device 2 and stripe units A(4) and C(3) are obtained from device 4. Thus, the read operations for reconstructing device 3 are now distributed amongst the remaining devices of the array. Reconstruction reads and writes may simultaneously occur at multiple devices. Note that it is not necessary for the reconstruction load to be balanced evenly in all embodiments. In a preferred embodiment, reconstruction reads are at least partially parallelized among at least three storage devices.

While the mechanism has been illustrated using a rotational group in FIGS. 4 and 5, many other permutations of strip units may be used for mirroring data across the array that will achieve improved load balancing in degraded modes of operation. Preferably, to ease the computational overhead of tracking storage unit mappings, the mirrored data is striped according to a mathematical structure, such as a rotational group. Other mathematical structures, such as structures determined by other conical section type functions, may be employed in other embodiments. Essentially any permutation of mirrored stripe units may be employed. However, the original and mirrored copy of each stripe unit should be stored on different devices. In other words, the stripe unit order of a mirrored stripe should be different from the stripe unit order of the original stripe so that stripe units are not repeated on the same device. Also in a preferred embodiment, the stripe unit order between different mirrored data stripes of a group of mirrored data stripes is different so that reconstruction read operations are balanced between three or more devices of the array and preferably balanced between all remaining devices of the array. Thus, amongst groups of mirrored stripes, the order of stripe units may be different for each stripe unit of the group. However, the ordering may be repeated amongst different groups of mirrored data stripes. For example, in the rotational striping of FIG. 4, the rotational grouping may be repeated every n−1 mirrored data stripes for an array of n devices.

Figure 6:
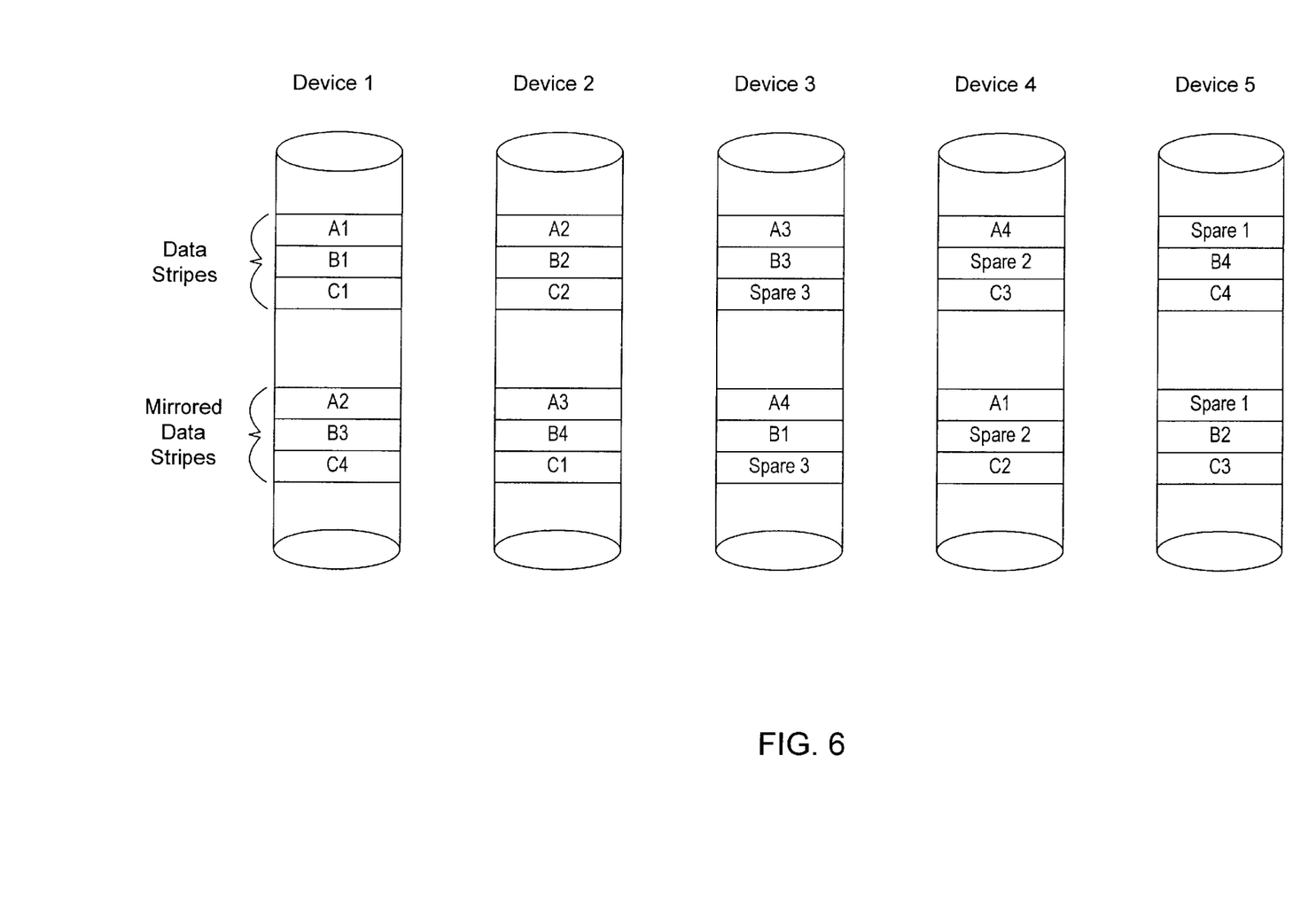
FIG. 6 is an illustration of a storage array employing data striping, distributed rotational mirroring and spare striping for improved load balancing.

As seen in the example of FIG. 5, read operations during reconstruction of a drive are well balanced, but write operations are still concentrated on one device (e.g. the replacement device in FIG. 5). Turning now to FIG. 6, a mechanism is illustrated in which improved balancing of both read and write operations may be achieved. Data is striped across the devices of the array and mirrored data is also striped according to a function that distributes mirrored stripe units across the array so that reconstruction reads may be balanced among three or more devices. A rotational distribution similar to that described for FIG. 4 may be employed. A spare device is also striped across the array. In the embodiment of FIG. 6 the spare device is striped cyclically and cross diagonally amongst the storage devices of the array. In the embodiment of FIG. 6 the spare stripe units are striped cyclically and cross diagonally for each group of data stripes, where a group of data stripes corresponds to the number of data stripes in which the data stripe mirroring order is repeated (e.g. three in this embodiment). Each data stripe includes n−1 data stripe units plus one spare stripe unit. It is understood that the spare device may be striped across the array in many different ways in which the spare stripe units are distributed in different orders than that shown in FIG. 6 as long as write operations are parallelized as discussed below. Note that in the example shown in FIG. 6, devices 1 and 2 do not include spare stripe units. This is merely because of the size of the array and rotational groupings shown in this example. In a larger array spare stripe units may be located on all devices.

Figure 7:
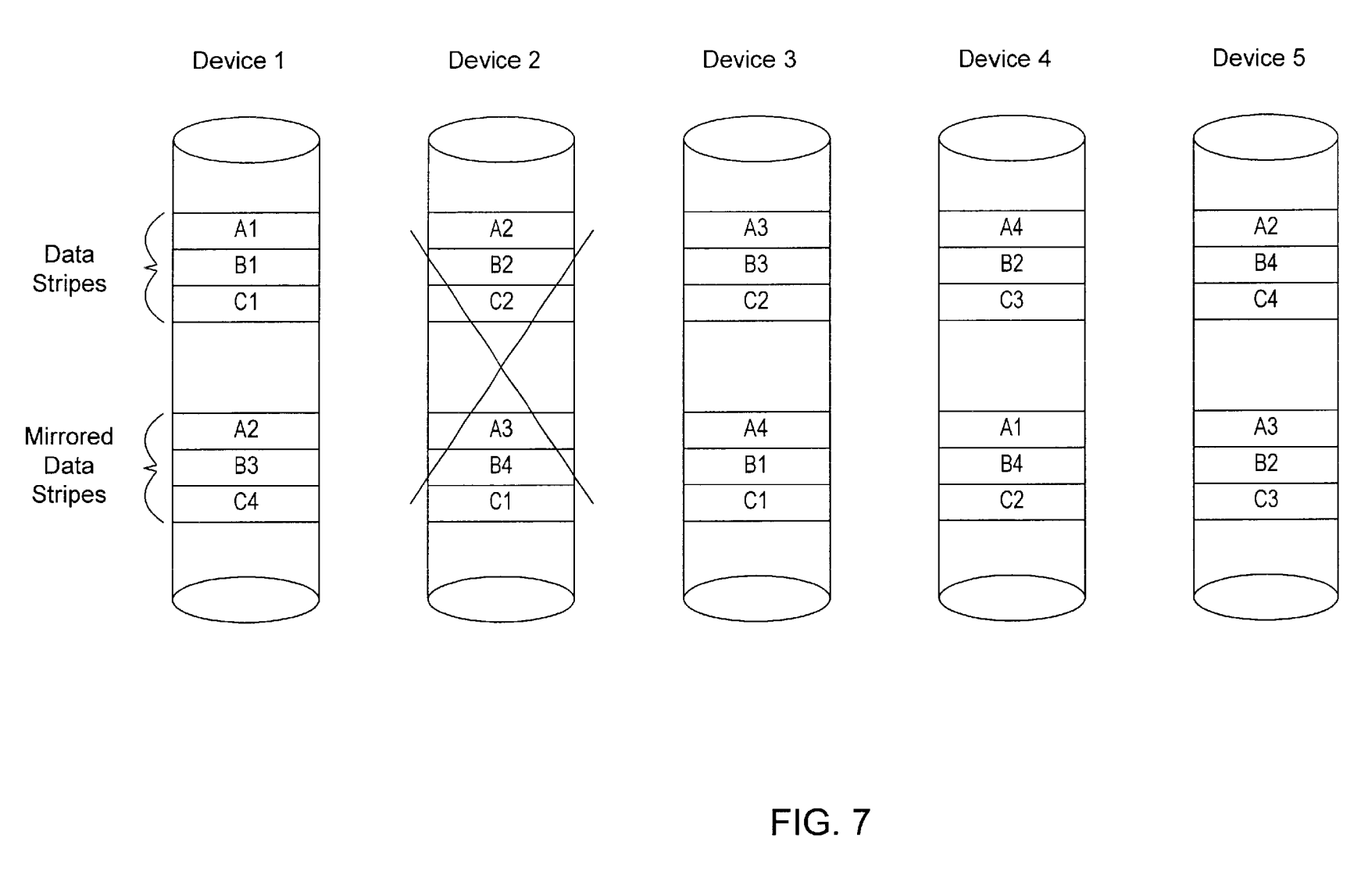
FIG. 7 a reconstruction operation for the array of FIG. 6.

Turning now to FIG. 7 it can be seen how reconstruction writes may be balanced amongst multiple devices if one of the devices fails. In this embodiment, instead of reconstructing the failed device on a replacement device, the data from the failed device may be reconstructed on the spare stripe units of remaining devices. The spare stripes provide a logical hot stand-by device. For example, if device 2 fails, data stripes A(2), B(2) and C(2) may be reconstructed onto devices 5, 4 and 3 respectively. Mirrored stripe units A(3), B(4) and C(1) may similarly be reconstructed. By examining FIG. 7 it can been seen that reconstruction writes have now been distributed amongst three different devices and reconstructions reads distributed amongst four different devices.

Unlike in the embodiment of FIGS. 4 and 5 where the reconstructed array retains the same mapping of stripe units, the reconstructed array of FIG. 7 has a different mapping of stripe units than the array shown in FIG. 6 before the device failure occurred. The storage controller tracks the different mapping after reconstruction. The mapping differences may be simplified by choosing different granularities between the spare striping and data striping. Also note that when a replacement drive is added, such as during a maintenance period, the original mapping may be restored if desired. Note that for the embodiment of FIG. 6 and 7 when a spare device is striped amongst the array, data from a failed device may be restored immediately to the spare stripe units without waiting for a replacement device to be installed. Also note that for other embodiments multiple spare devices may be striped throughout the array so that if one failure occurs an additional spare may still be present in case of a further failure.

Figure 8:
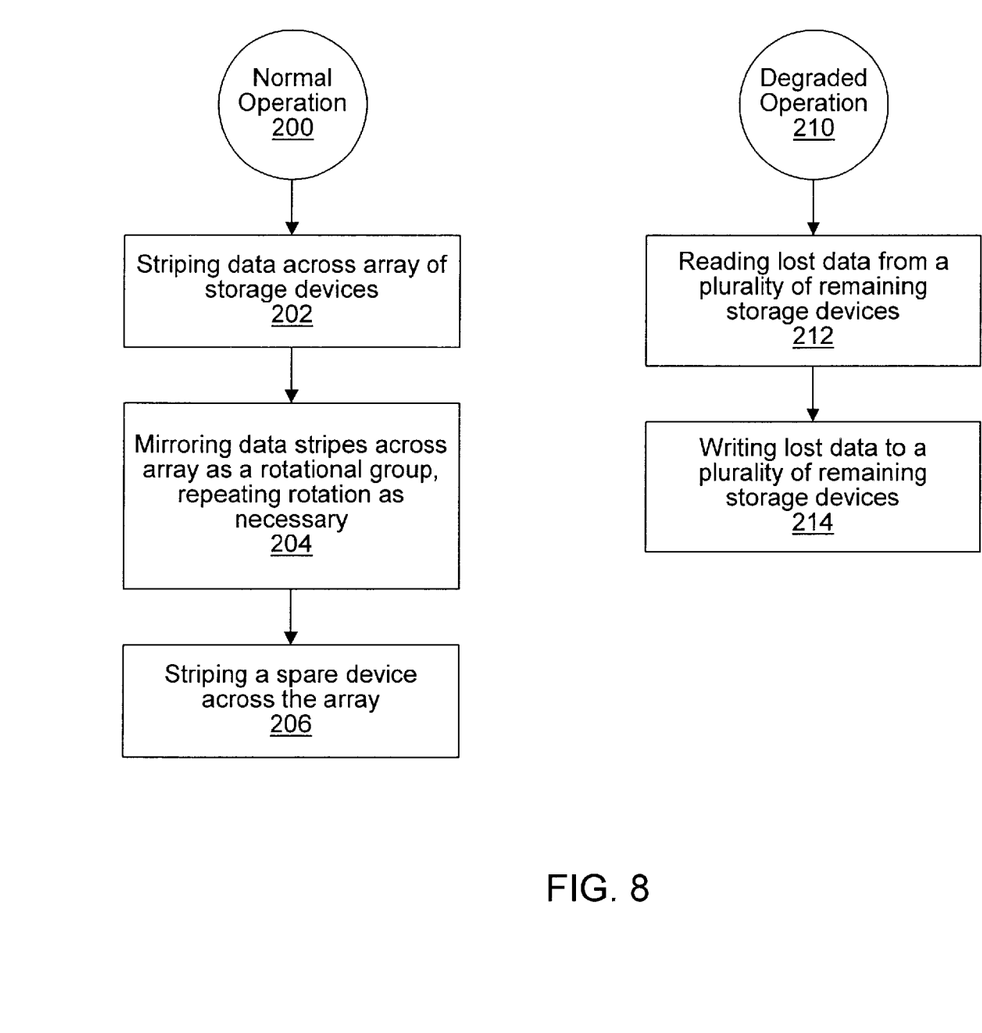
FIG. 8 illustrates a mechanism to improve load balancing for storage device reconstruction employing distributed mirrored and spare stripe units.

Turning now to FIG. 8, a mechanism for improving the balancing of read and/or write operations in a storage array for normal and degraded operation is illustrated. During normal operation (200) data is striped across the array of storage devices as indicated at 202. Each data stripe is also mirrored across the array according to a mathematical structure such as a rotational group so that copies of stripe units for any given device are distributed amongst numerous (e.g. more than three) devices of the array, as indicated at 204. The stripe unit copies are distributed so as to load balance reconstruction operations throughout the array. The mirroring stripe unit distribution (e.g. rotational group) may be repeated as necessary as often for multiple groups of data stripes. Additionally, one or more spare devices may be striped across the array, such as in a cyclical and diagonal or cross diagonal manner or other manner, as indicated at 206. Spare stripe units are distributed so as to load balance reconstruction write operations amongst multiple devices.

During degraded operation (210) lost data is read from a plurality of the remaining storage devices as indicated at 212. In a preferred embodiment, reads of lost data are distributed amongst three or more devices and even more preferably all the devices of the array. Also, write operations of the lost data may be performed to spare stripe units on a plurality of the remaining storage devices, as indicated at 214. Reads and writes may be performed simultaneous among multiple devices.

Note that the diagrams of FIG. 8 do not imply any particular order of operation but merely illustrate the ongoing mechanisms that are applied during normal and degraded operations. By distributing mirrored stripe units amongst the drives in a manner so that data to reconstruct any drive of the array is distributed across numerous ones of the remaining devices, the efficiency of a reconstruction operation after a device failure may be greatly improved. Similarly, by use of spare striping in combination with the distributed mirror striping (e.g. rotational mirror striping) write operations during reconstruction after a device failure may also be better balanced throughout the array.

The load balancing mechanism described herein may also be used to improve load balancing in normal operation, as well as degraded operation. During normal operation, one of the storage devices may become a bottleneck, e.g., a large number of access requests may be queued for that device while other devices are idle. Access requests for the bottleneck device may be shifted to other devices that have a copy of the requested data on the bottleneck device. Such requests may be shifted to devices that have a lighter load or are idle. The load balancing mechanism described herein, in which a rotational or other structure has been used to distribute mirror stripes across the array, makes many more of the devices in the array available for such shifting. This is because the mechanism described herein distributes copies of the stripe units on each device across up to all the other devices of the array. In contrast, for techniques of FIGS. 1 and 2 data copies for each device are located on only one or two other devices. Thus, for the techniques of FIGS. 1 and 2, bottlenecked requests could only be shifted to one or two other devices, which may result in those devices becoming bottlenecked.

Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. An array of storage devices, comprising:
   at least three storage devices configured to store stripes of data;
   a first stripe of data stored as a plurality of first stripe units stored consecutively across consecutive ones of said storage devices;

a second stripe of data stored as a plurality of second stripe units stored in the same consecutive order as said first stripe units across said consecutive ones of said storage devices;

a first stripe copy forming a copy of said first stripe of data consecutively stored as copies of said first stripe units, wherein each one of the copies of said first stripe units is consecutively stored on a different one of said storage devices than the one of the first stripe units of which it is a copy; and a second stripe copy forming a copy of said second stripe of data consecutively stored as copies of said second stripe units, wherein each one of the copies of said second stripe units is consecutively stored on a different one of said storage devices than the one of the second stripe units of which it is a copy; and wherein said copies of said first stripe units are consecutively stored on said storage devices in a first order, and wherein said copies of said second stripe units are consecutively stored on said storage devices in a second order, wherein said first order is different than said second order;

wherein each of said consecutive ones of said storage devices stores a different set of said first and said second stripe units and said copies of said first and said second stripe units than another one of said consecutive ones of said storage devices.

2. The array as recited in claim 1, wherein said first order is the order in which said first stripe units are stored across said storage devices rotated by one storage device, and wherein said second order is the order in which said second stripe units are stored across said storage devices rotated by two storage devices.

3. The array as recited in claim 1, wherein said storage devices are disk drives.

4. The array as recited in claim 1, wherein each one of said storage devices is a different disk drive cylinder.

5. The array as recited in claim 1, wherein each one of said first and second stripe units comprises a block of data.

6. The array as recited in claim 1, wherein each one of said first and second stripe units comprises at least one bit of data.

7. The array as recited in claim 1, wherein said storage devices comprise at least four storage devices.

8. A storage system, comprising:

an array of at least four storage devices; and a storage controller coupled to said storage devices, wherein said storage controller is configured to store data in stripes of consecutive stripe units across said storage devices, wherein said storage controller is further configured to mirror each stripe of data as a mirrored stripe of consecutive stripe units on said storage devices, and wherein said storage controller is further configured to perform a reconstruction operation to reconstruct lost data from a failed one of said storage devices, wherein said reconstruction operation comprises reading different portions of the lost data from at least three remaining storage devices of the array; wherein each of said storage devices stores a different set of data than another one of said storage devices.

9. The storage system as recited in claim 8, wherein said reconstruction operation comprises reading different portions of the lost data from all of the remaining storage devices of the array.

10. The storage system as recited in claim 8, wherein said array has an odd number of storage devices.

11. The storage system as recited in claim 8, wherein said storage devices are disk drives.

12. The storage system as recited in claim 8, wherein each one of said storage devices is a different disk drive cylinder.

13. The storage system as recited in claim 8, wherein said reconstruction operation comprises writing different portions of the lost data to at least two remaining storage devices of said array.

14. The storage system as recited in claim 8, wherein said reconstruction operation comprises writing different portions of the lost data to all of the remaining storage devices of said array.

15. A storage system, comprising:

an array of n storage devices, where n is greater than two; and a storage controller coupled to said storage devices, wherein said storage controller is configured to store a group of data stripes across said storage devices, wherein each data stripe has a plurality of stripe units with each stripe unit consecutively stored on different ones of said storage devices;

wherein said storage controller is further configured to store a copy of said group of data stripes on said storage devices, wherein said copy of said group of data stripes comprises a series of data stripe copies, each data stripe copy comprising stripe units consecutively stored on said storage devices in a rotated position from the stripe units of which they are copies, wherein the stripe units of a first one of the series of data stripe copies is rotated by one storage device position, and wherein the stripe units of each one of the other data stripe copies is rotated by one more position than the previous data stripe copy;

wherein each of said storage devices stores a different set of stripe units than another one of said storage devices.

16. The storage system as recited in claim 15, wherein said group of data stripes has n−1 data stripes.

17. The storage system as recited in claim 16, wherein said storage controller is configured to store additional groups of data stripes, wherein the stripe unit rotations of said data stripe copies are repeated for each group.

18. The storage system as recited in claim 15, wherein each data stripe has n stripe units.

19. The storage system as recited in claim 15, wherein each data stripe has n−1 stripe units and a spare stripe unit.

20. The storage system as recited in claim 19, wherein the spare stripe unit for each data stripe of the group of data stripes is stored on a different device.

21. A method for distributing copies of data in an array of storage devices, the method comprising:

storing a first data stripe across the storage devices, wherein said first data stripe has a plurality of first stripe units with each one of said first stripe units consecutively stored on different ones of the storage devices;

storing a copy of the first data stripe on the storage devices, wherein said copy of said first data stripe comprises first stripe unit copies consecutively stored on the storage devices rotated by one position from said first stripe units;

storing a series of additional data stripes across the storage devices, wherein each additional data stripe has a plurality of additional stripe units consecutively stored on different ones of the storage devices; and storing copies of the additional data stripes on the storage devices, wherein the stripe units of a first one of the copies of the additional data stripes is rotated by one more consecutive storage device position than said first stripe unit copies, and wherein the stripe units of each additional data stripe copies is rotated by one more consecutive position than the previous additional data stripe copy; wherein each of the storage devices stores a different set of stripe units than another one of the storage devices.

22. The method as recited in claim 21, further comprising for each of said first data stripe, said additional data stripes, said copy of the first data stripe, and said copies of the additional data stripes, storing a spare stripe unit on one of the storage devices, wherein the spare stripe units are striped across the storage devices.

23. A method for storing data in an array of storage devices, the method comprising:

storing data in stripes across the storage devices;

mirroring each stripe of data on the storage devices as a mirrored stripe of consecutive stripe units, wherein each of the storage devices stores a different set of stripe units than another one of the storage devices;

reconstructing lost data from a failed one of the storage devices, wherein said reconstructing comprises reading different portions of the lost data from at least three remaining storage devices of the array.

24. The method as recited in claim 23, wherein said reconstructing comprises reading different portions of the lost data from all of the remaining storage devices of the array.

25. The method as recited in claim 23, wherein the array has an odd number of storage devices.

26. The method as recited in claim 23, wherein the storage devices are disk drives.

27. The method as recited in claim 23, wherein each one of the storage devices is a different disk drive cylinder.

28. The method as recited in claim 23, wherein said reconstructing comprises writing different portions of the lost data to at least two remaining storage devices of the array.

29. The method as recited in claim 23, wherein said reconstructing comprises writing different portions of the lost data to all of the remaining storage devices of the array.

30. A method for storing data on an array of storage device, the method comprising:

storing a group of original data stripes across the storage devices;

mirroring the group of original data stripes on the storage devices, wherein each mirrored data stripe for the group of mirrored data stripes has a plurality of stripe units consecutively stored on the storage devices in a different position than the other mirrored data stripes of the group and in a different position from the data stripe which it mirrors, wherein the group of mirrored data stripes has at least three mirrored data stripes; and repeating said storing and mirroring for additional groups of data stripes, wherein each of the storage devices stores a different set of stripe units than another one of the storage devices.

31. The method as recited in claim 30, wherein the different positions for the group of mirrored stripes are determined according to a mathematical function.

32. The method as recited in claim 30, wherein the different positions for the group of mirrored stripes is the set of rotations from the position of the original data stripes excluding the identity rotation.

33. The method as recited in claim 30, further comprising storing a spare data stripe across the storage devices for each group of original and mirrored data stripes.

* * * * *